United States Patent
Tanaka et al.

(10) Patent No.: US 12,440,191 B2
(45) Date of Patent: Oct. 14, 2025

(54) ULTRASOUND IMAGING APPARATUS AND SIGNAL PROCESSING METHOD

(71) Applicant: FUJIFILM Healthcare Corporation, Kashiwa (JP)

(72) Inventors: Chizue Tanaka, Chiba (JP); Misaki Hiroshima, Chiba (JP); Aya Kishimoto, Chiba (JP); Teiichiro Ikeda, Chiba (JP); Satoshi Tanaka, Chiba (JP); Kazuhiro Amino, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 18/137,133

(22) Filed: Apr. 20, 2023

(65) Prior Publication Data
US 2023/0338008 A1    Oct. 26, 2023

(30) Foreign Application Priority Data

Apr. 22, 2022 (JP) .................. 2022-071020

(51) Int. Cl.
*A61B 8/00* (2006.01)
*G01S 7/52* (2006.01)

(52) U.S. Cl.
CPC .......... *A61B 8/5269* (2013.01); *A61B 8/5207* (2013.01); *G01S 7/52077* (2013.01); *G01S 7/52085* (2013.01)

(58) Field of Classification Search
CPC .......... G01S 7/52085; G01S 7/52033
See application file for complete search history.

(56) References Cited

U.S. PATENT DOCUMENTS 4,631,710 A * 12/1986 Yamaguchi .......... G10K 11/346
                                                    367/905
4,676,105 A *  6/1987 Matzuk .............. H03H 11/1217
                                                    600/443

(Continued)

FOREIGN PATENT DOCUMENTS

JP      2007-167116 A     7/2007
JP      2021-159511 A     10/2021

*Primary Examiner* — Keith M Raymond
*Assistant Examiner* — Ashish S Jasani
(74) *Attorney, Agent, or Firm* — Paul Teng

(57) ABSTRACT

Provided is an ultrasound imaging apparatus capable of automatically and stably optimizing an imaging parameter for each examination even in a situation where an original ultrasound signal and electrical noise or the like are mixed in a reception signal, and shortening examination time. A pilot ultrasound signal for detecting a feature of a subject is radiated from an ultrasound element to the subject. Based on a reception signal from the ultrasound element, a feature value, which is a value representing a mode of distribution in a depth direction of the subject or an energy value at a specific depth of energy of the pilot ultrasound signal, is calculated. A predetermined parameter value is determined based on the feature value. An imaging signal is transmitted to one or more ultrasound elements, and an imaging ultrasound signal is radiated from the ultrasound element to the subject. A reception signal that is output by the ultrasound element receiving the imaging ultrasound signal reflected by the subject is processed using the parameter value to generate an image.

10 Claims, 11 Drawing Sheets

(56) References Cited

U.S. PATENT DOCUMENTS

| | | | | |
|---|---|---|---|---|
| 6,102,859 A | * | 8/2000 | Mo | A61B 8/00 |
| | | | | 600/443 |
| 2012/0323122 A1 | * | 12/2012 | Okubo | A61B 8/4488 |
| | | | | 600/443 |
| 2018/0000452 A1 | * | 1/2018 | Adams | G01S 7/52095 |
| 2018/0153521 A1 | * | 6/2018 | Martins | A61B 8/5269 |
| 2021/0038187 A1 | * | 2/2021 | Schafer | G01S 7/52084 |

* cited by examiner

FIG. 2A
FIG. 2C
TRANSMISSION SIGNAL INPUT TO ULTRASOUND PROBE
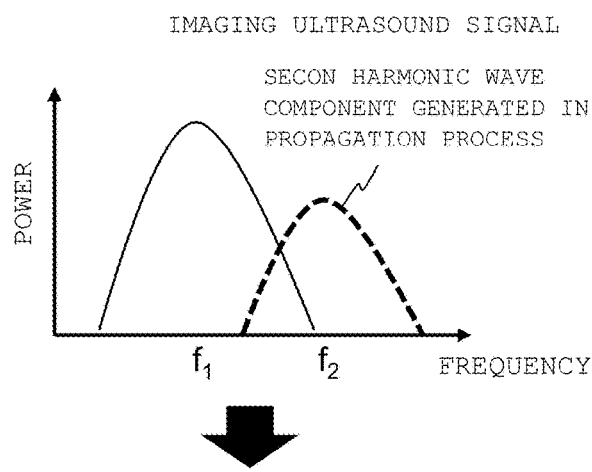
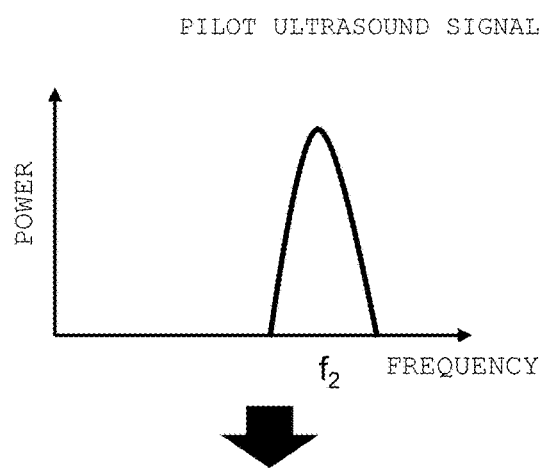
FIG. 2B
FIG. 2D
RECEPTION SIGNAL AND FILTER
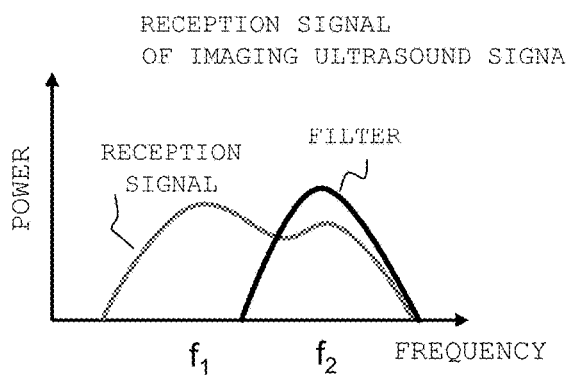
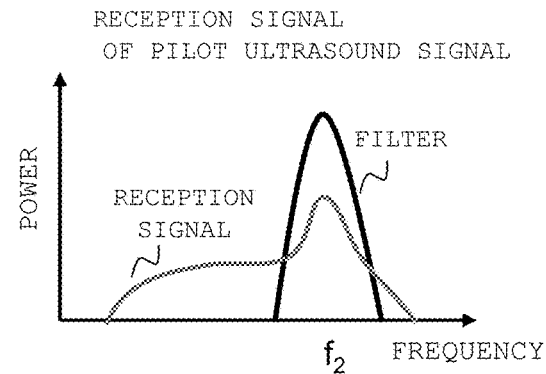

ULTRASOUND IMAGING APPARATUS AND SIGNAL PROCESSING METHOD

BACKGROUND OF THE INVENTION

1. Field of the Invention

The present invention relates to setting of an imaging parameter of an ultrasound imaging apparatus.

2. Related Art

In a medical ultrasound examination using an ultrasound imaging apparatus, an examiner checks a moving image displayed in real time while operating an ultrasound probe. At this time, only when the examiner adjusts an imaging parameter of the ultrasound probe and the imaging apparatus to an appropriate value according to a patient and an imaging site, an appropriate image for diagnosis can be obtained. Since there are a large number of parameters to be adjusted, it takes time to set the imaging parameters, which increases complexity of the examination. For the purpose of shortening examination time and reducing the complexity of the examination, there is known an apparatus that prepares an imaging parameter set in advance and automatically selects an appropriate parameter set according to a connected probe.

JP2007-167116A (Patent Literature 1) discloses an apparatus that automatically selects an appropriate imaging parameter set based on body weight, body fat percentage, age, gender, physique, and a diagnosis target site of a patient in a patient database registered in advance.

However, actually, states of tissues and internal organs in the body of the patient greatly differ depending on the patient. A method of pressing a probe against the patient differs depending on the examiner. Further, even in the same organ, appropriate images are different depending on the content to be examined. For this reason, it is difficult to obtain an appropriate image for diagnosis for all combinations of the patient, the examiner, and the content to be examined using an automatic setting technique for imaging in the related art such as that disclosed in Patent Literature 1. Accordingly, finally, it is necessary to manually and appropriately set an imaging parameter for each examination. An adjustment operation of the parameter needs to be performed in consideration of the state of the patient, characteristics of ultrasound waves, and the like, and knowledge and experience are required.

JP2021-159511A (Patent Literature 2) discloses an apparatus that evaluates a received ultrasound signal and performs filter control to set a parameter value for removing noise from the ultrasound signal for each biological tissue in which a plurality of tissues are intertwined. According to this apparatus, it is possible to automatically perform appropriate noise removal in consideration of a state of a patient, characteristics of ultrasound waves, and the like, and it is possible to reduce an operation of setting an imaging parameter for each examination.

CITATION LIST

Patent Literature

PTL 1: JP2007-167116A
PTL 2: JP2021-159511A

SUMMARY OF THE INVENTION

The invention of Patent Literature 2 has a configuration in which the received ultrasound signal is evaluated and filter control is performed, and in the received ultrasound signal, a noise signal irrelevant to a phenomenon occurring in an original propagation process, such as an artifact signal generated in a propagation process of ultrasound waves or an electrical noise normally generated in an electric circuit or the like of the apparatus, is mixed with a signal of original propagated ultrasound waves. For this reason, when the received ultrasound signal is evaluated, the received ultrasound signal may be affected by noise, erroneous evaluation may occur in the first place, it may be difficult to perform intended filter control, and an appropriate parameter may not be stably set. In Embodiment 5 of Patent Literature 2, in order to perform the intended filter control, an apparatus for repeatedly performing ultrasound transmission and reception on the same transmission and reception line and evaluating an obtained ultrasound signal is disclosed, but it takes time to construct an image, and thus a frame rate of a moving image is lowered.

An object of the invention is to provide an ultrasound imaging apparatus capable of automatically and stably optimizing an imaging parameter for each examination without impairing the real time of a moving image even in a situation where an original ultrasound signal and electrical noise or the like are mixed in a reception signal, and shortening examination time.

In order to achieve the above object, an ultrasound imaging apparatus of the invention includes: a transmission unit connected to one or more ultrasound elements and configured to switch between a pilot signal for causing the ultrasound element to generate a pilot ultrasound signal for detecting a feature of a subject and an imaging signal for causing the ultrasound element to generate an imaging ultrasound signal and transmit the pilot signal and the imaging signal; a reception unit connected to the one or more ultrasound elements and configured to receive a reception signal that is output by the ultrasound element receiving an ultrasound wave from the subject; a signal and image processing unit configured to perform signal processing on the reception signal based on the imaging ultrasound signal using a predetermined parameter to generate an image, and perform image processing on the generated image using a predetermined parameter; a switch; a feature value calculation unit; and a parameter determination unit. The switch is disposed between the reception unit and the feature value detection unit and the signal and image processing unit, and transmits the reception signal received by the reception unit to the feature value detection unit when the reception signal is a reception signal based on the pilot ultrasound signal. The feature value detection unit calculates a feature value, which is a value representing a mode of distribution in a depth direction of the subject or an energy value at a specific depth of energy of the pilot ultrasound signal, based on the reception signal received from the switch. The parameter determination unit determines, based on the feature value, one or more parameter values among parameters used for processing performed by the signal and image processing unit.

According to the invention, even in a situation where an original ultrasound signal and electrical noise or the like are mixed in a reception signal, it is possible to stably optimize an imaging parameter for each examination without impairing the real time of a moving image. Accordingly, examination time can be shortened.

BRIEF DESCRIPTION OF THE DRAWINGS

FIG. 2A is a diagram showing a frequency band of an imaging ultrasound signal of the ultrasound imaging apparatus 100 according to Embodiment 1.

FIG. 2B is a diagram showing a frequency band of a reception signal of the imaging ultrasound signal of the ultrasound imaging apparatus 100 according to Embodiment 1.

FIG. 2C is a diagram showing a frequency band of a pilot ultrasound signal according to Embodiment 1.

FIG. 2D is a diagram showing a frequency band of a reception signal of the pilot ultrasound signal according to Embodiment 1.

DESCRIPTION OF THE PREFERRED EMBODIMENTS

Figure 1:
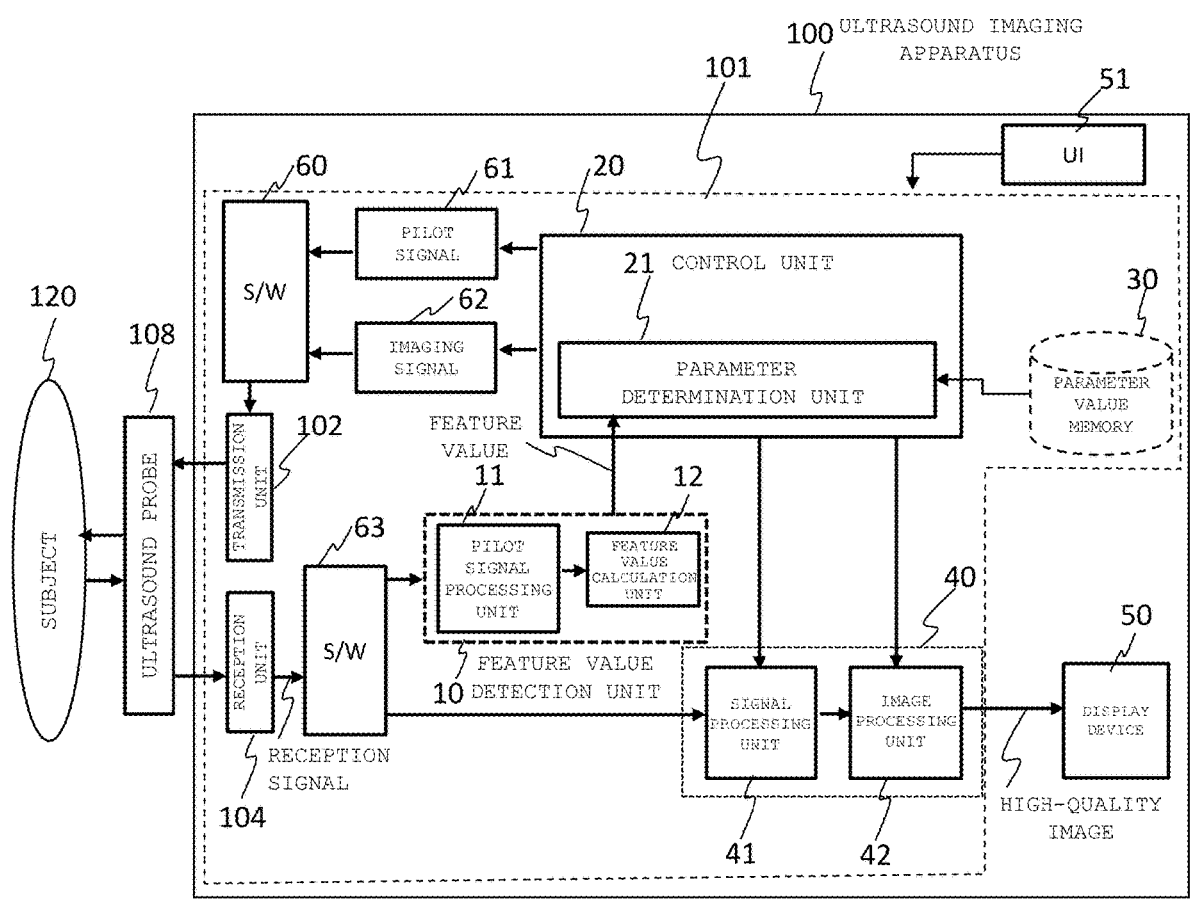
FIG. 1 is a block diagram showing an overall configuration of an ultrasound imaging apparatus 100 according to Embodiment 1.

Embodiments of the invention will be described with reference to the drawings.

A sound wave has a frequency-dependent attenuation characteristic in a propagation process, and a characteristic of a received ultrasound signal is different for each propagation distance, that is, imaging depth (time). Since reflectance and the frequency-dependent attenuation characteristic of the sound wave vary depending on a state of a medium (tissue) through which the sound wave propagates, the characteristic of the received ultrasound signal also varies depending on a state of a patient and an imaging site. Therefore, by analyzing a feature of the received ultrasound signal, the propagation process of ultrasound waves in a subject can be known. By setting a parameter value or the like of an ultrasound imaging apparatus using information on the propagation process, it is possible to perform signal and image processing for generating an optimum image for diagnosis for each examination.

Meanwhile, in the ultrasound signal received by the ultrasound imaging apparatus, a signal irrelevant to a phenomenon occurring in an original propagation process, such as an artifact signal generated in a propagation process of ultrasound waves or an electrical noise normally generated in an electric circuit or the like of the apparatus, is mixed with a signal derived from the propagated ultrasound waves. Since such an unnecessary signal may cause an erroneous analysis result when a feature of a reception signal is analyzed, it is difficult to stably provide an appropriate image using the information on the propagation process.

In the present embodiment, before transmitting an imaging ultrasound signal, a pilot ultrasound signal for detecting a feature of the subject is transmitted to the subject. A feature value generated in the reception signal by propagation of the pilot ultrasound signal in a depth direction in a subject is calculated based on the reception signal. A parameter to be used for signal processing and image processing to be applied to a reception signal of the imaging ultrasound signal is determined using the feature value.

Since the pilot ultrasound signal can be radiated under a condition different from that of the imaging ultrasound signal, the pilot ultrasound signal can be radiated such that the reception signal of the pilot ultrasound signal is less affected by noise than the reception signal of the imaging ultrasound signal. For example, a center frequency of the pilot ultrasound signal can be matched with a frequency component of the reception signal used when an image is generated based on the reception signal of the imaging ultrasound signal. As an example, when harmonic imaging is performed, a pilot ultrasound signal having twice a frequency of the imaging ultrasound signal can be transmitted, and thus it is possible to obtain a reception signal of the pilot ultrasound signal having energy larger than that of a second harmonic wave of the imaging ultrasound signal.

Accordingly, it is possible to reduce an influence of the artifact signal and the electrical noise normally generated in the electric circuit or the like of the apparatus, accurately evaluate the reception signal of the pilot ultrasound signal, and stably provide an appropriate image.

Hereinafter, Embodiments 1 to 3 will be more specifically described.

Embodiment 1

An ultrasound imaging apparatus 100 according to Embodiment 1 will be described with reference to the drawings. FIG. 1 shows an overall configuration of the ultrasound imaging apparatus 100.

As shown in FIG. 1, the ultrasound imaging apparatus 100 includes a transmission unit 102, a signal processing device 101, a user interface (UI) 51 such as an input device, and a display device 50. An ultrasound probe 108 including an array in which a plurality of ultrasound elements are arranged is connected to the ultrasound imaging apparatus 100.

The signal processing device 101 includes a pilot signal generation unit 61 that generates a pilot signal (electric signal), an imaging signal generation unit 62 that generates an imaging signal (electric signal), a switch 60, and a transmission unit. The switch 60 switches the pilot signal or the imaging signal and inputs the pilot signal or the imaging signal to the transmission unit 102. Accordingly, the transmission unit 102 can switch between a pilot signal used for detecting the feature of the subject and the imaging signal and transmit the pilot signal and the imaging signal to the ultrasound probe 108.

The signal processing device 101 includes a reception unit 104 connected to each ultrasound element of the ultrasound probe 108, a switch 63, a feature value detection unit 10, a signal and image processing unit 40, a control unit 20, and a parameter value memory 30. A parameter determination unit 21 is disposed in the control unit 20.

When the ultrasound element of the ultrasound probe 108 receives the pilot signal from the transmission unit 102, the ultrasound element converts the pilot signal (electric signal) into a pilot ultrasound signal (ultrasound wave) and irradiates a subject 120 with the pilot ultrasound signal. Similarly, when the ultrasound element of the ultrasound probe 108 receives the imaging signal from the transmission unit 102, the ultrasound element converts the imaging signal into an imaging ultrasound signal and irradiates the subject 120 with the imaging ultrasound signal.

The ultrasound signal propagates through the subject 120 and is reflected and scattered by an internal tissue, and reaches the ultrasound probe 108 again. The ultrasound element of the ultrasound probe 108 receives ultrasound waves and outputs a reception signal.

The reception unit 104 receives the reception signal from the ultrasound element of the ultrasound probe 108.

The switch 63 is disposed between the reception unit 104 and the feature value detection unit 10 and the signal and image processing unit 40. The switch 63 transmits the reception signal received by the reception unit 104 to the feature value detection unit 10 when the reception signal is a reception signal based on the pilot ultrasound signal.

The feature value detection unit 10 includes a pilot signal processing unit 11 and a feature value calculation unit 12. The feature value detection unit 10 calculates a feature value, which is a value representing a mode of distribution in a depth direction of the subject 120 or an energy value at a specific depth of energy of the pilot ultrasound signal, based on the reception signal received from the switch 63.

The parameter determination unit 21 of the control unit 20 determines, based on the feature value calculated by the feature value detection unit 10, one or more parameter values among parameters used for the processing by the signal and image processing unit 40. The control unit 20 uses the parameter value determined by the parameter determination unit 21 to control each unit so that ultrasound imaging is performed.

The signal and image processing unit 40 includes a signal processing unit 41 and an image processing unit 42. The signal and image processing unit 40 performs signal processing on the reception signal based on the imaging ultrasound signal using a plurality of parameter values including the parameter values determined by the parameter determination unit 21 to generate an image, and performs image processing on the generated image. The image generated by the signal and image processing unit 40 is displayed on the display device 50.

Frequency of Pilot Signal

The pilot ultrasound signal can be radiated under a condition different from that of the imaging ultrasound signal. Therefore, the pilot ultrasound signal is radiated under a condition that the reception signal of the pilot ultrasound signal is less affected by noise than the reception signal of the imaging ultrasound signal.

Figure 3:
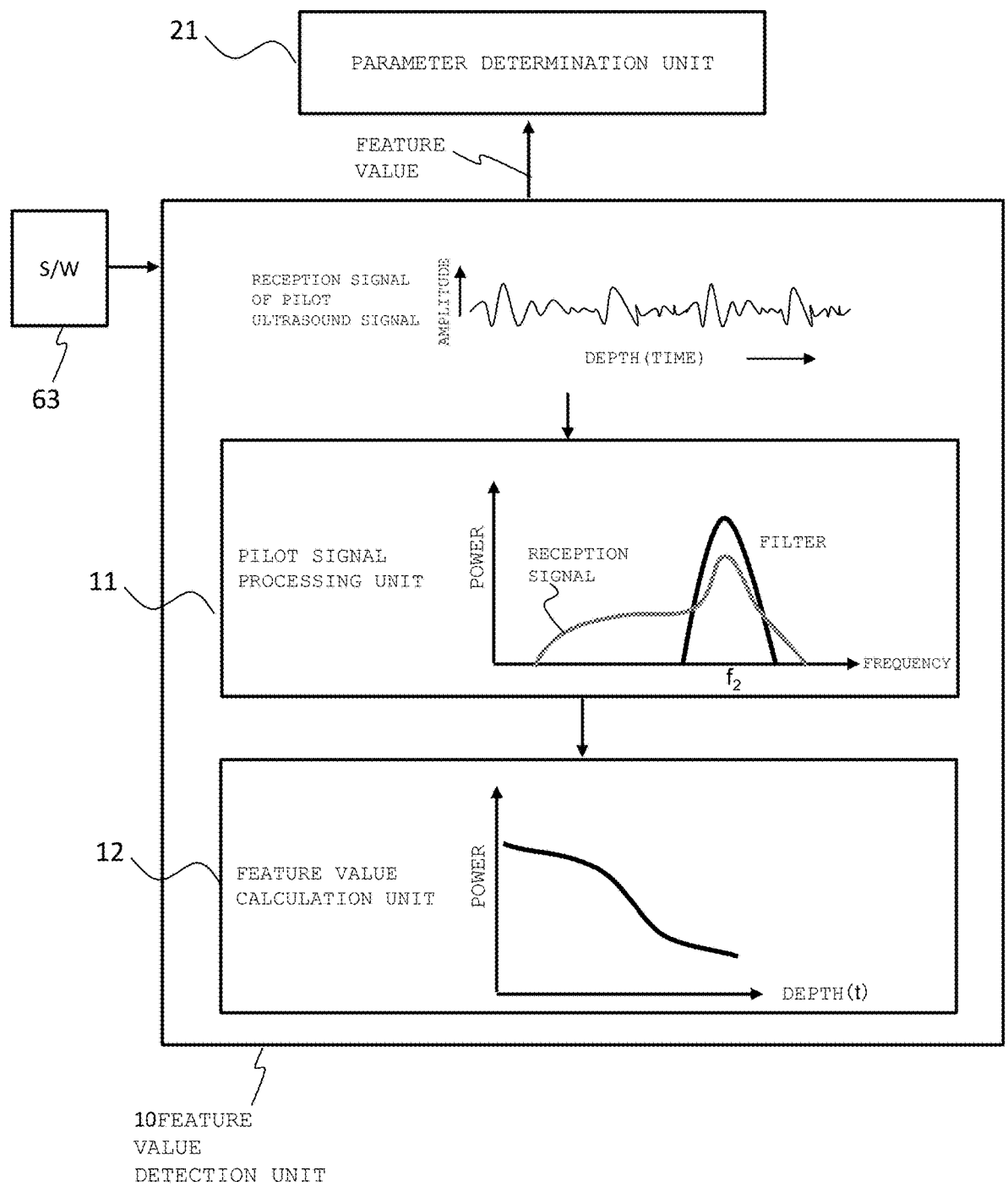
FIG. 3 is a block diagram showing a configuration of a feature value detection unit 10 of the ultrasound imaging apparatus 100 according to Embodiment 1.

FIGS. 2A and 2C show examples of frequencies of the imaging signal and the pilot signal, and FIGS. 2B and 2D are diagrams showing frequency bands of reception signals. FIG. 3 is a diagram showing a configuration of the feature value detection unit 10.

As shown in FIGS. 2A to 2D, the control unit 20 controls the pilot signal generation unit 61 and the imaging signal generation unit 62 such that a center frequency f2 of the pilot signal matches with a frequency component f2 that is used for image generation based on the reception signal of the imaging ultrasound signal by the signal and image processing unit 40.

Specifically, for example, when harmonic imaging is performed, as shown in FIG. 2A, the transmission unit 102 transmits an imaging signal of the center frequency f1 to the ultrasound probe 108 to generate an imaging ultrasound signal (center frequency f1). Since a second harmonic wave component f2 is generated when the imaging ultrasound signal propagates in the subject 120, the reception signal received in a reception band of the ultrasound probe 108 includes the frequency component f1 and the frequency component f2 in FIG. 2B. A frequency component with a maximum intensity is the frequency component f1. The signal and image processing unit 40 extracts the second harmonic wave component f2 included in the reception signal using a bandpass filter to generate an image.

When the harmonic imaging is performed, as shown in FIG. 2C, the control unit 20 sets a center frequency of the pilot signal to f2 that is twice a center frequency of the imaging signal, and transmits the pilot signal to the ultrasound probe 108 to generate a pilot ultrasound signal (center frequency f2). Accordingly, as shown in FIG. 2D, since the reception signal received in the reception band of the ultrasound probe 108 has a largest power at the frequency component f2 in FIG. 2D, a characteristic of a change depending on a depth of energy of ultrasound waves having the frequency f2 when the ultrasound waves propagate through the subject 120 is most strongly expressed than the other frequency components. Therefore, by obtaining a feature value, which is a value representing a mode of distribution in a depth direction of the energy of the pilot ultrasound signal or an energy value at a specific depth, using this reception signal, the feature value detection unit 10 is less likely to be affected by noise and can accurately detect the feature value, as compared with the case where the feature value is obtained based on the reception signal of the imaging ultrasound signal.

The center frequency of the pilot signal is set to a frequency component used for image generation, and in addition, by setting a wave number of the transmission signal to two or more waves, a signal band of the transmission signal is made narrower. In a normal imaging signal, the resolution of an image is increased by using a short pulse of about one wave, while the frequency band of the reception signal is broad by being a short pulse. In the pilot signal, by using two or more consecutive ultrasound signals, the frequency component of the reception signal is narrower than that in the case of transmitting the short pulse. In the narrow band, since energy is concentrated on a specific frequency component, for example, f2, a signal-to-noise ratio in a signal component of f2 is higher than that in the case of transmitting the short pulse. Therefore, it is less likely to be affected by noise, and the feature value can be detected with high accuracy.

Feature Value Detection Unit 10

As shown in FIGS. 1 and 3, the feature value detection unit 10 includes the pilot signal processing unit (extraction unit) 11 and the feature value calculation unit 12. As shown in FIG. 2D and FIG. 3, the pilot signal processing unit (extraction unit) 11 extracts a reception signal having a predetermined frequency f2 as a center frequency from the reception signal of the pilot ultrasound signal using a bandpass filter or the like. Accordingly, signals such as an electrical noise or the like having a frequency band other than a frequency band of the center frequency f2 can be removed. The signal extracted by the pilot signal processing unit 11 is time series data (depth direction data) reflecting an energy amount of the reception signal of the pilot ultrasound signal. The feature value calculation unit 12 calculates a feature value based on the signal extracted by the pilot signal processing unit 11. Therefore, the feature value calculation unit 12 can know a propagation process of the ultrasound waves having the frequency f2 in the subject 120 in a robust manner with respect to the electrical noise and calculate a feature value.

Examples of the feature value calculated by the feature value calculation unit 12 include a gradient, an attenuation amount, and the like as a value representing a mode of distribution in a depth direction of energy of a reception pilot signal. Not only a value in an entire depth direction, but also an energy value at a specific depth can be used.

A frequency and the like of the above-described pilot signal will be further described.

Assuming that the center frequency of the imaging transmission signal is f1, a harmonic component is generated in a frequency band of f2 corresponding to an approximately double frequency, based on a nonlinear propagation phenomenon of ultrasound waves (FIG. 2A). In the harmonic imaging, the signal and image processing unit 40 is imaged with the harmonic component as a main component (FIG. 2B). Therefore, a frequency band of a characteristic signal of the reception signal to be known in imaging is f2. The harmonic component (frequency f2) has less energy than a band of the frequency f1 of an original fundamental wave component and is easily buried in an electrical noise signal (see FIG. 2B). Therefore, the control unit 20 sets, as a pilot signal, a transmission waveform with f2 as the center frequency, and causes the transmission unit 102 to transmit the pilot signal. Accordingly, a reception signal of the pilot ultrasound signal having a higher signal-to-noise ratio than a reception signal obtained by the imaging ultrasound signal is obtained (FIG. 2D).

At this time, a frequency band of the reception signal of the pilot ultrasound signal changes depending on a response frequency characteristic of the ultrasound probe 108 that transmits and receives ultrasound waves to and from the subject 120. Therefore, in order to acquire a reception signal robust to the electrical noise, the control unit 20 causes the pilot signal processing unit 11 to perform band filter processing with f2 as the center frequency. Accordingly, a reception signal having a higher signal-to-noise ratio is generated, and an error in the feature value calculated by the feature value calculation unit 12 is less likely to occur.

Parameter Determination Unit 21

Figure 4:
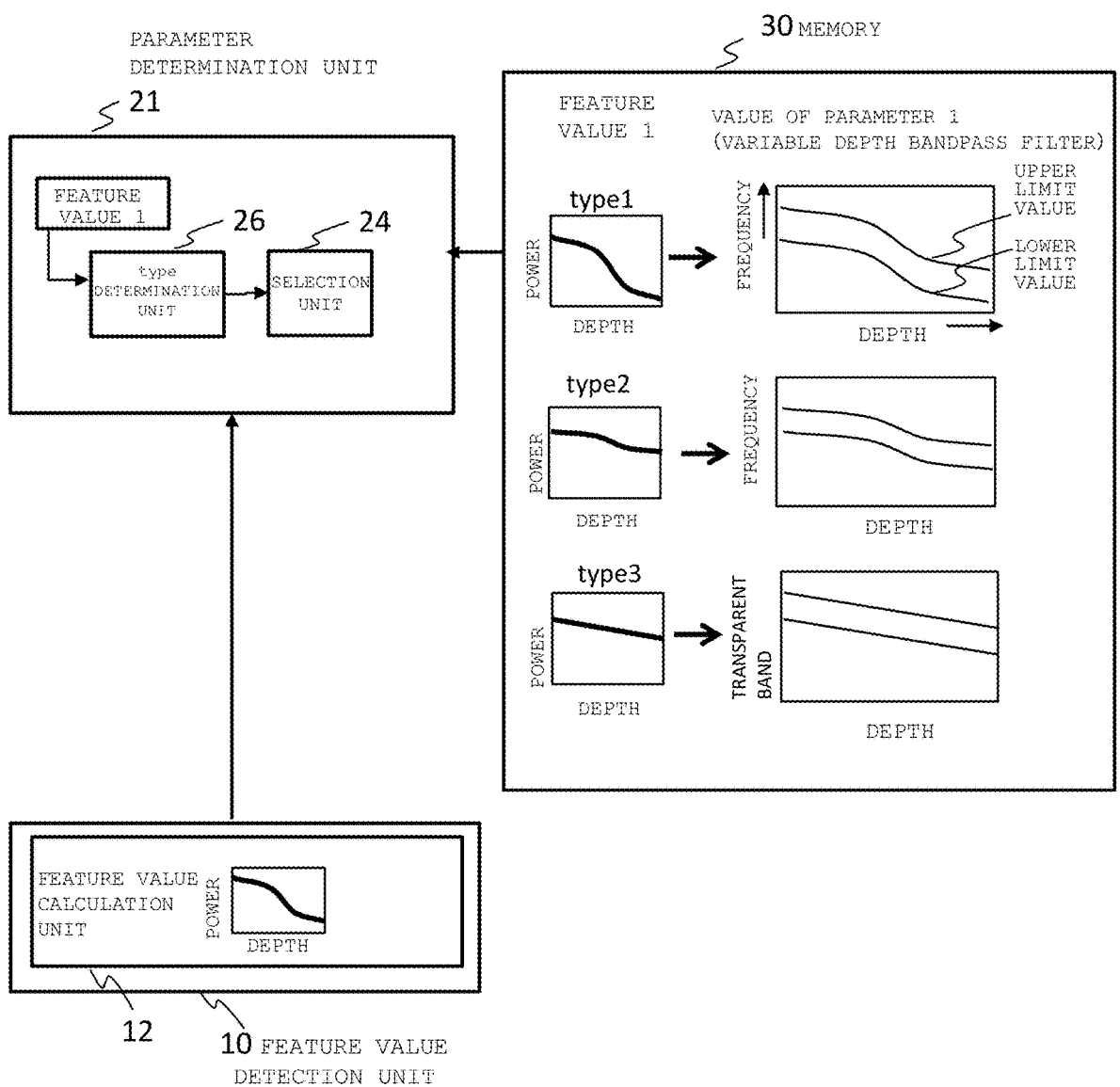
FIG. 4 is a block diagram showing configurations of a parameter determination unit 21 and a parameter value memory 30 of the ultrasound imaging apparatus 100 according to Embodiment 1.
Figure 5:
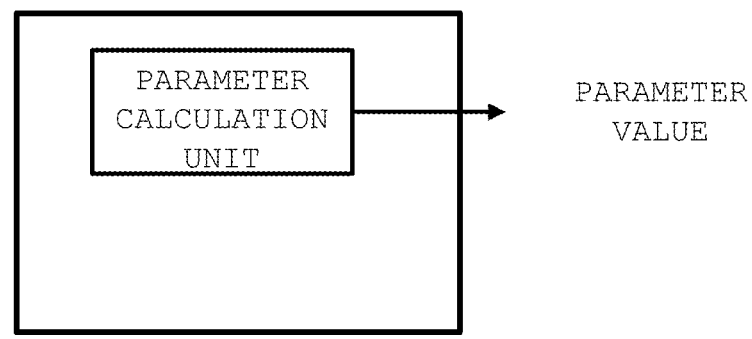
FIG. 5 is a block diagram showing another configuration example of a parameter determination unit 21 of the ultrasound imaging apparatus 100 according to Embodiment 1.

As shown in FIGS. 4 and 5, a configuration of the parameter determination unit 21 is shown.

As shown in FIG. 4, the parameter determination unit 21 includes a type determination unit 26 and a parameter selection unit 24. The parameter determination unit 21 receives feature value from the feature value calculation unit 12. The type determination unit 26 determines a type of feature value of the subject in accordance with a predetermined criterion, and transmits a determination result to the parameter selection unit 24.

In the parameter value memory 30, an appropriate parameter value is stored in advance for each type of the feature value.

The parameter selection unit 24 selects an appropriate parameter by selecting a parameter value corresponding to the type of the determination result of the type determination unit 26 from the parameter value stored in the parameter value memory 30. The control unit 20 instructs the signal processing unit 41 and/or the image processing unit 42 of the signal and image processing unit 40 to perform processing based on the parameter value selected by the parameter determination unit 21.

As shown in FIG. 5, the parameter determination unit 21 may include a parameter calculation unit that calculates a parameter based on the feature value received from the feature value calculation unit 12.

Examples of the parameter determined by the parameter determination unit 21 include at least one of a center frequency, a bandwidth, and a cutoff frequency of a frequency band used when the signal and image processing unit 40 processes a reception signal by the variable depth bandpass filter. The parameter determination unit 21 can also determine a gain used when the reception signal is subjected to a time gain control (TGC) process as a parameter.

The parameter determination unit 21 may determine a parameter of a transmission signal such as a frequency of an imaging transmission signal based on the feature value. For example, when there is no type that satisfies a predetermined type criterion as a result of feature value calculation and type determination, there is a possibility that it is difficult to image a subject with a frequency component of an imaging signal. In this case, a parameter condition for changing a center frequency of the transmission signal to a low frequency side is determined. By being transmitted and received at a low center frequency, a sound wave is less likely to be affected by attenuation during propagation of the subject, and thus a reception signal having energy sufficient for imaging can be obtained. By determining a parameter using a pilot signal even under a condition of a low center frequency, it is possible to set an appropriate reception parameter suitable for the subject, and to generate an optimal image for diagnosis.

Operation of Signal Processing Device 101

Figure 6:
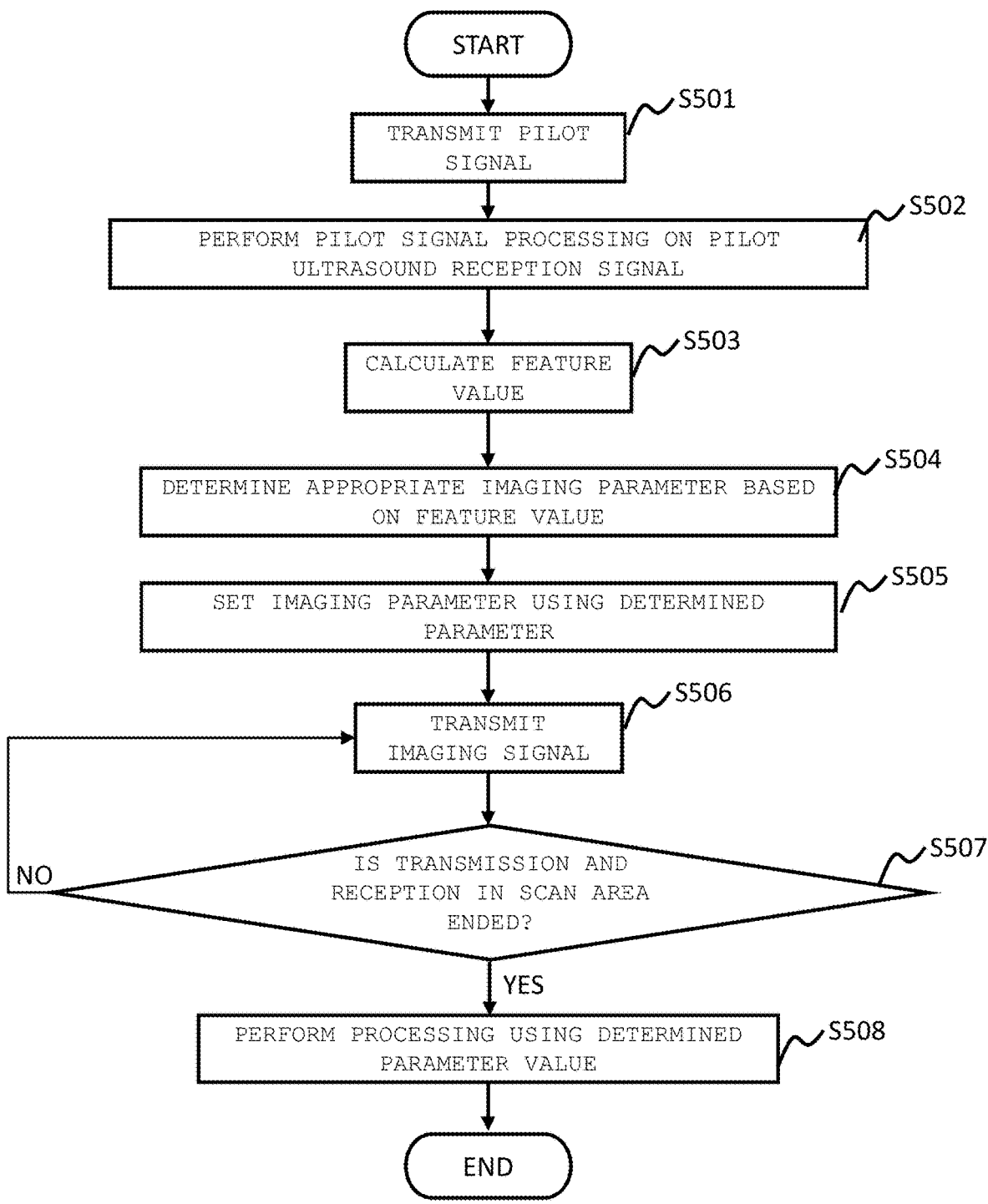
FIG. 6 is a flowchart showing an operation of each part of a signal processing device 101 of the ultrasound imaging apparatus 100 according to Embodiment 1.

Next, operations of units of the signal processing device 101 will be described with reference to a flowchart in FIG. 6.

Here, the signal processing device 101 can be implemented by hardware. For example, a custom IC such as an application specific integrated circuit (ASIC) or a programmable IC such as a field-programmable gate array (FPGA) may be used to design a circuit to implement functions of the units. In addition, the functions of a part or all of the signal processing device 101 may be implemented by software. In this case, a part or all of the signal processing device 101 are implemented by a computer including a processor such as a central processing unit (CPU) or a graphics processing unit (GPU) and a memory, and the CPU reads and executes a program stored in the memory to implement these functions.

Here, the transmission unit 102 and the reception unit 104 perform beamforming in order to increase an acoustic power in a predetermined scan line direction.

Step S501

Figure 7A:
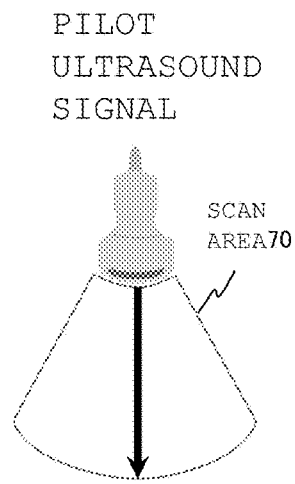
FIG. 7A is a view illustrating a transmission direction of the pilot ultrasound signal according to Embodiment 1.
Figure 7A:
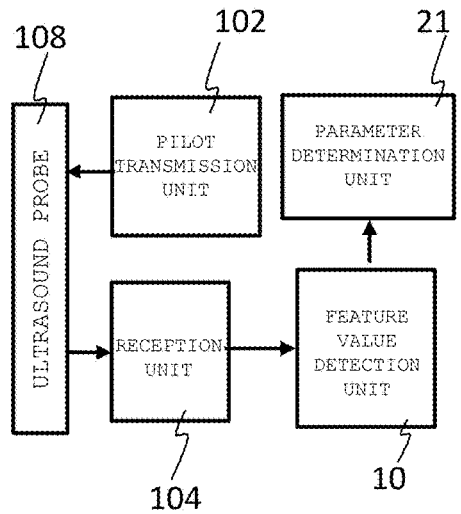

Under control of the control unit 20, the transmission unit 102 receives, for example, a pilot signal having the frequency f2 from the pilot signal generation unit 61 via the switch 60, generates a pilot signal delayed by a predetermined amount for each ultrasound element of the ultrasound probe 108, and transmits the pilot signal to the ultrasound probe 108. The ultrasound element converts the pilot signal into a pilot ultrasound signal, and irradiates the subject 120 with the pilot ultrasound signal. Accordingly, as shown in FIG. 7A, a pilot ultrasound signal subjected to transmission beamforming is radiated in a predetermined direction of a predetermined imaging scan area (imaging area).

A part of the pilot ultrasound signal is reflected or scattered in the subject 120 while propagating in the subject 120, and a part of the reflected or scattered ultrasound wave reaches the ultrasound element of the ultrasound probe 108 and is converted into a reception signal. The ultrasound element outputs a time series reception signal. The reception unit 104 receives reception signals from the ultrasound elements, delays the reception signals by predetermined time, and then adds the reception signals to perform reception beamforming.

Step S502

The pilot signal processing unit 11 processes the reception signals after the reception beamforming using a bandpass filter having the center frequency f2, and extracts a signal in a predetermined band centered on the center frequency f2. Accordingly, time series data reflecting the energy of the pilot ultrasound signal in which target feature value can be calculated in a robust manner with respect to the electrical noise is extracted.

Step S503

The feature value calculation unit 12 outputs feature value from the signal in the predetermined band centered on the center frequency f2 extracted by the pilot signal processing unit 11. For example, as the feature value, a change in depth direction of the energy of the reception signal in the depth direction is calculated.

Step S504

The parameter determination unit 21 determines an optimal parameter value for the subject based on the feature value calculated by the feature value calculation unit 12. Specifically, the parameter determination unit 21 selects, from the parameter value memory 30, a parameter value corresponding to the feature value calculated by the feature value calculation unit 12. The parameter is, for example, a cutoff frequency of the variable depth bandpass filter.

Step S505

The control unit 20 sets the parameter value determined by the parameter determination unit 21 in the signal and image processing unit 40. The control unit 20 sets a predetermined value or a value set by an operator as a parameter value necessary for the reception signal processing other than the determined parameter.

Steps S506 to S507

Figure 7B:
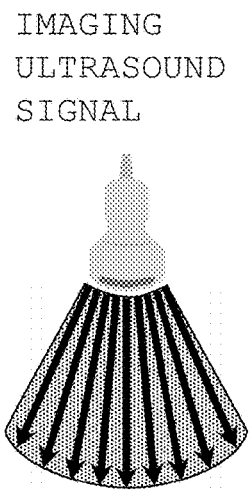
FIG. 7B is a view illustrating a transmission direction of the imaging ultrasound signal according to Embodiment 1.
Figure 7B:
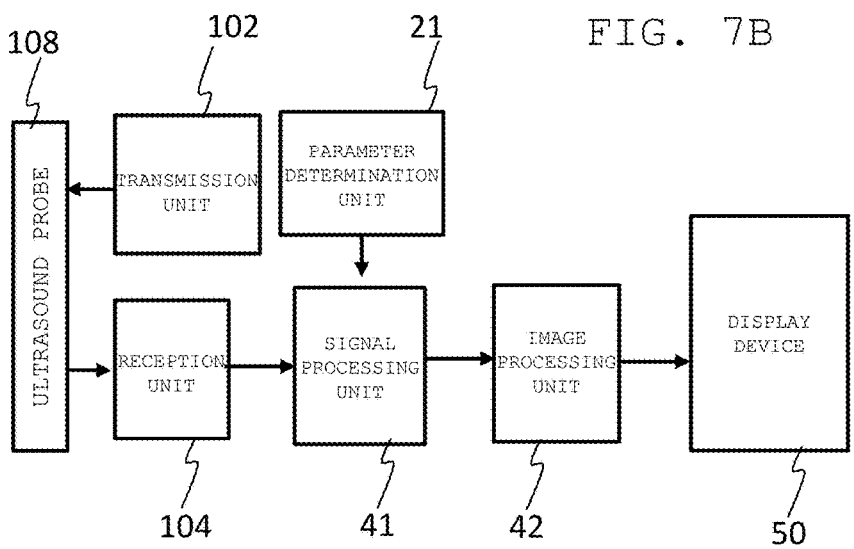
Figure 7C:
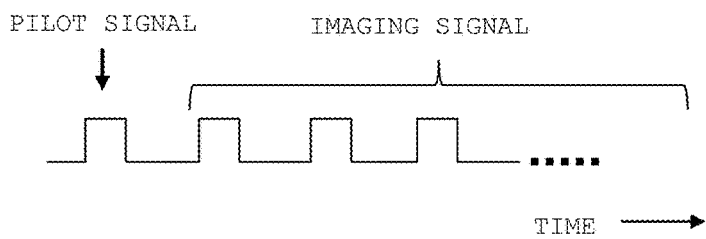
FIG. 7C is a diagram showing a sequence of transmission timings of a pilot signal and an imaging signal according to Embodiment 1.

The transmission unit 102 receives, for example, an imaging signal having the frequency f1 from the imaging signal generation unit 62 via the switch 60, generates an imaging signal delayed by a predetermined amount for each ultrasound element, and transmits the imaging signal to the ultrasound probe 108. The ultrasound element converts the imaging signal into an imaging ultrasound signal and irradiates the subject 120 with the imaging ultrasound signal. Accordingly, an imaging ultrasound signal subjected to transmission beamforming is radiated in a predetermined direction of a predetermined imaging scan area (imaging area). This processing is repeated as shown in FIG. 7C, and imaging signals are sequentially transmitted in a plurality of predetermined scanning directions of the imaging scan area (FIG. 7B).

A part of the imaging ultrasound signal is reflected or scattered in the subject 120 while propagating in the subject 120, and reflected or scattered ultrasound waves reach the ultrasound element of the ultrasound probe 108 and are converted into a reception signal. The ultrasound element outputs a time series reception signal. The reception unit 104 receives the reception signal and performs reception beamforming.

Step S508

The signal processing unit 41 performs signal processing on the reception signal of each imaging transmission signal after the reception beamforming, using the parameter value (for example, the cutoff frequency of the variable depth bandpass filter) set in step S505. The processed reception signal is output to the image processing unit 42.

The image processing unit 42 generates an image of one frame by arranging the received signals after reception beamforming for each scan line. The image processing unit 42 performs image processing on the generated image using the parameter set in step S505.

When the parameter determination unit 21 does not determine an image processing parameter from the feature value, the control unit 20 outputs only a control signal for instructing the image processing unit 42 to generate an image. After generating the image of one frame by arranging the received signals after reception beamforming for each scan line, the image processing unit 42 performs image processing using a predetermined parameter value.

The image processing unit 42 outputs the generated image to the display device 50 and causes the display device 50 to display the generated image.

As described above, according to the present embodiment, the pilot ultrasound signal is transmitted separately from the imaging ultrasound signal, the feature value can be calculated in a robust manner with respect to the noise, and the propagation process of the ultrasound waves in the subject can be correctly known. Therefore, an optimal parameter corresponding to the subject can be stably determined, and a moving image optimal for diagnosis can be provided for each examination.

The calculation of the feature value in a process for determining the parameter does not require a frequency analysis with a high calculation processing cost. Therefore, the calculation of the feature value can be easily implemented even in an ultrasound imaging apparatus that requires real-time processing. Since pilot signal transmission is only added to normal imaging scanning at a low frequency in one representative direction, an influence of lowering a frame rate is fairly small.

Since a frequency at which the pilot signal according to the present embodiment is transmitted and the parameter is determined may be once for one frame or once per several frames, there is little influence on a decrease in the frame rate.

Embodiment 2

Figure 8:
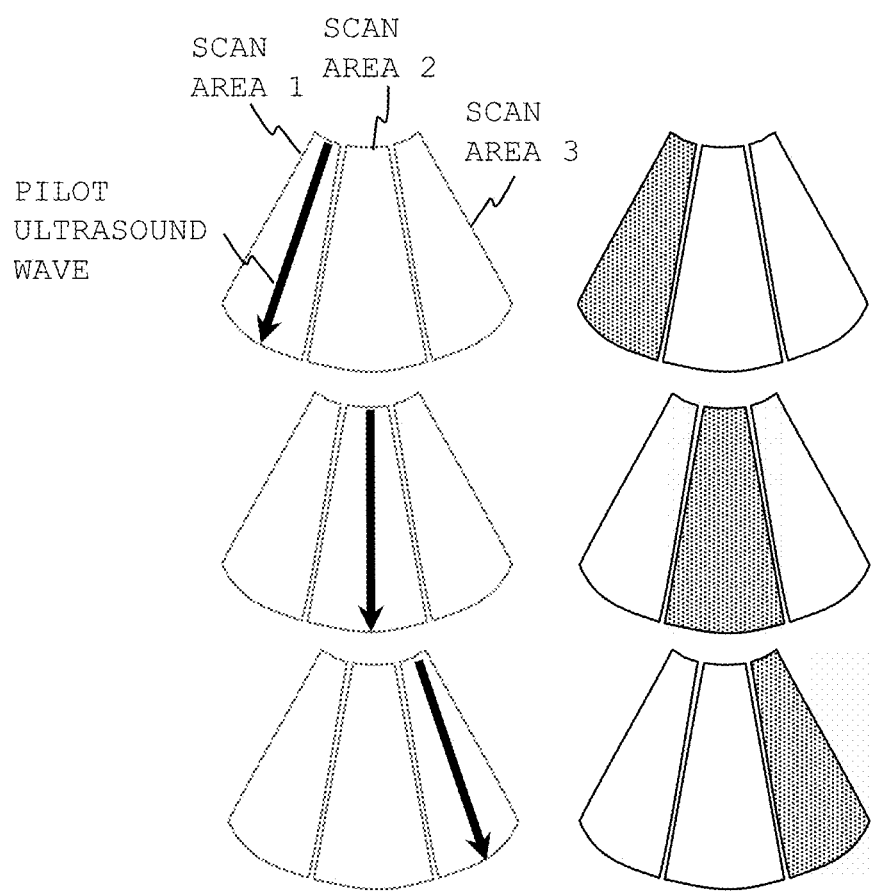
FIG. 8 is a view illustrating divided imaging scan areas (imaging areas) of the ultrasound imaging apparatus 100 according to Embodiment 2 and transmission directions of pilot ultrasound signals.
Figure 9A:
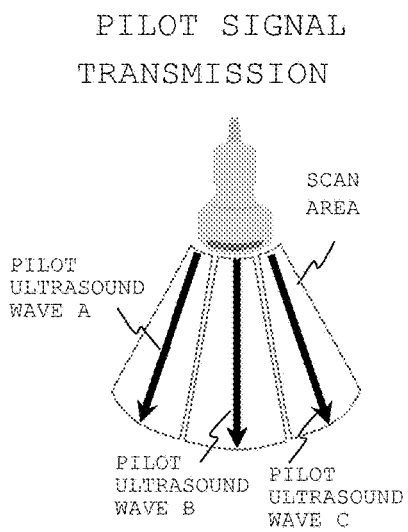
FIG. 9A is a view illustrating the transmission directions of the pilot ultrasound signals according to Embodiment 2.
Figure 9A:
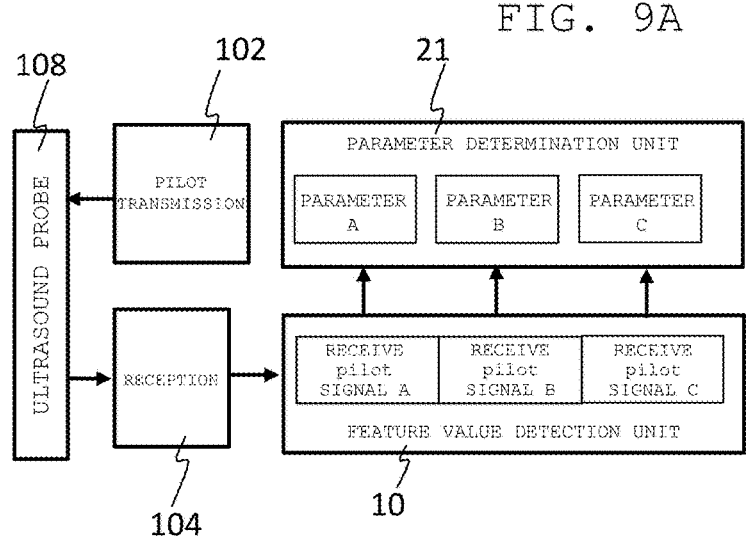
Figure 9B:
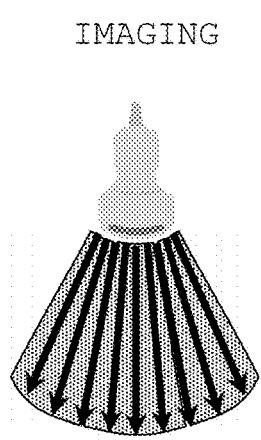
FIG. 9B is a view illustrating transmission directions of imaging ultrasound signals according to Embodiment 2.
Figure 9B:
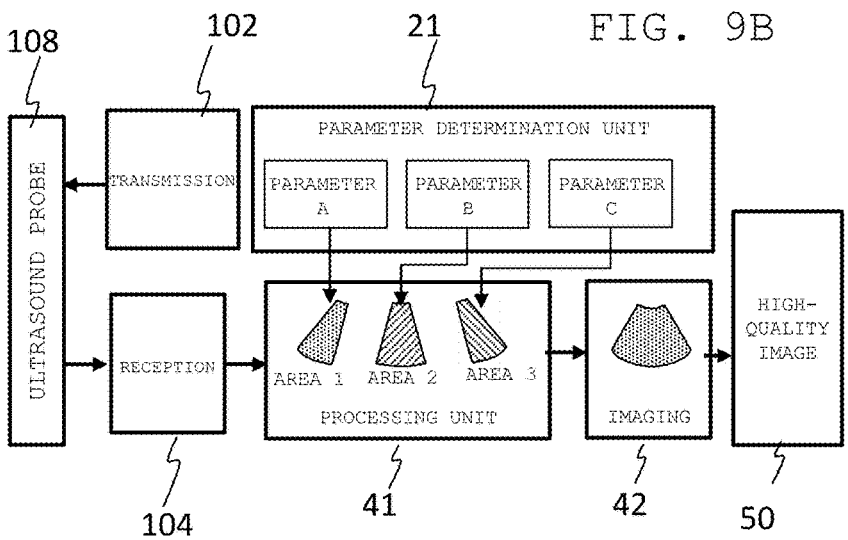
Figure 9C:
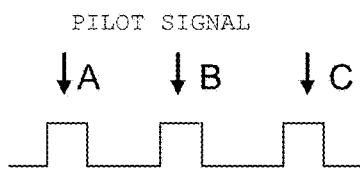
FIG. 9C is a diagram showing a sequence of transmission timings of a pilot signal and an imaging signal according to Embodiment 2.
Figure 9C:
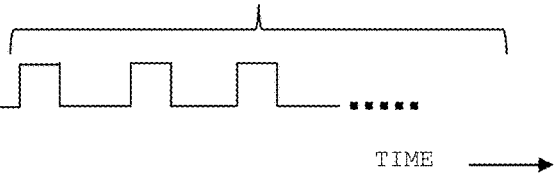

An ultrasound imaging apparatus according to Embodiment 2 will be described. FIG. 8 is a view illustrating divided scan areas and a pilot ultrasound signal, FIGS. 9A and 9B illustrate transmission of a pilot ultrasound signal and transmission of an imaging ultrasound signal, and FIG. 9C shows a sequence.

In Embodiment 2, as illustrated in FIG. 8, under control of the control unit 20, the transmission unit 102 divides a scan area (imaging area) into a plurality of areas in an azimuth direction, and transmits one pilot ultrasound signal for each of the divided areas.

The feature value detection unit 10 calculates, for each of the divided areas, feature value for a reception signal of the pilot ultrasound signal transmitted to the area.

The parameter determination unit 21 determines a parameter value based on the feature value for each of the divided areas.

The signal and image processing unit generates an image of the entire imaging area by generating an image using the determined parameter value for each of the divided areas.

According to the present embodiment, it is possible to provide a high-quality image suitable for diagnosis by applying an appropriate imaging parameter even in a subject having different ultrasound characteristics in the azimuth direction.

Embodiment 3

An ultrasound imaging apparatus according to Embodiment 3 will be described.

In Embodiment 1, a frequency of transmitting a pilot signal and determining a parameter is a predetermined frequency (for example, once per frame), whereas in Embodiment 3, a configuration will be described in which a pilot signal is transmitted and a parameter is determined when some actions are taken.

Embodiment 3-1

Figure 10:
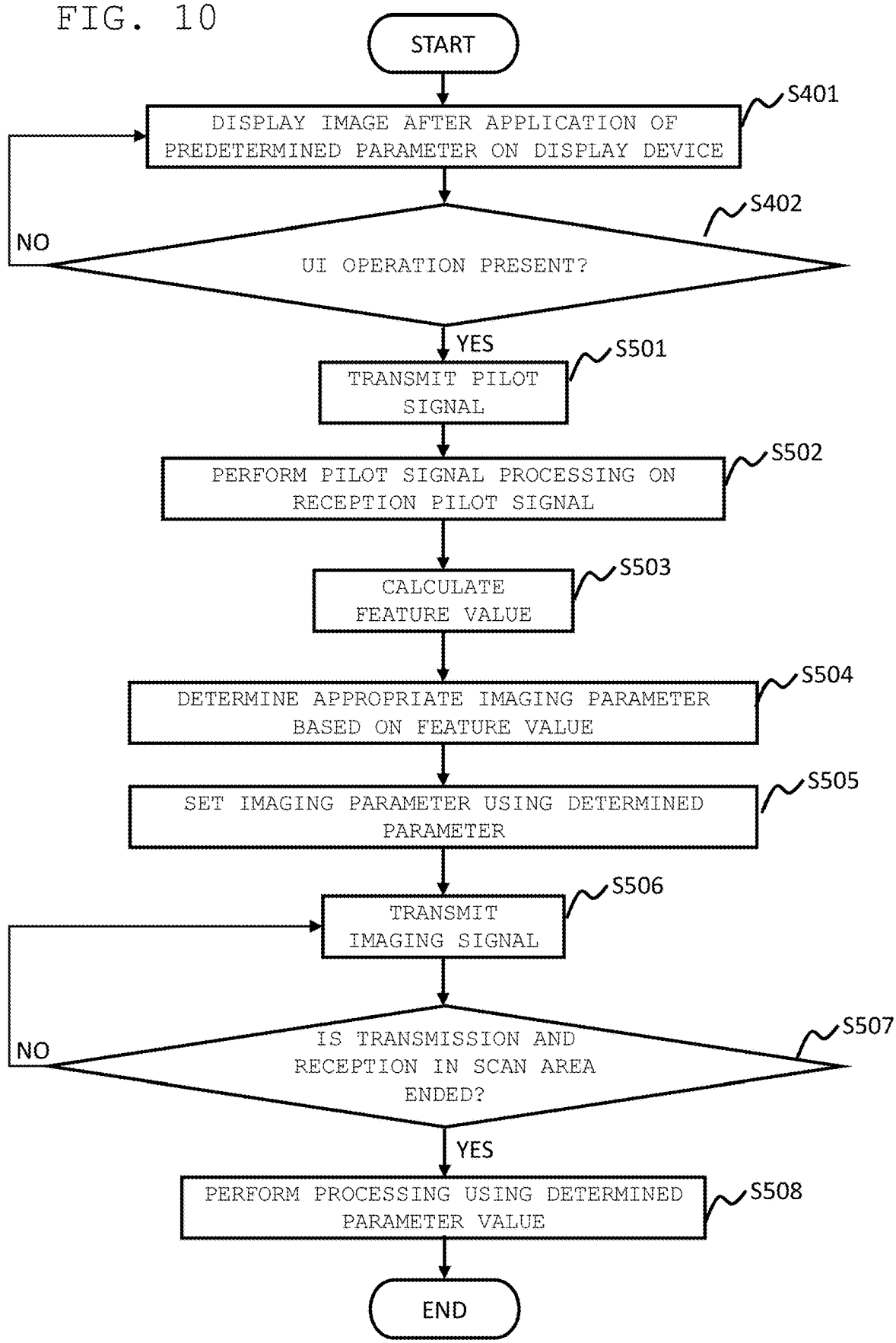
FIG. 10 is a flowchart showing an operation of each part of the ultrasound imaging apparatus 100 according to Embodiment 3-1.

First, an example in which a pilot signal is transmitted and a parameter is determined when an examiner operates (performs an action) a UI 51 of the ultrasound imaging apparatus will be described with reference to a flowchart of FIG. 10. Examples of the actions include an action when the examiner requests, an action when the examiner changes an imaging condition on the UI 51, an action when the examiner cancels the stop of scanning.

Step S401

The control unit 20 displays, on the display device 50, an image generated by the signal and image processing unit 40 using a predetermined parameter value.

Steps S402 and S501

The control unit 20 determines whether an operation is performed on the UI 51 (step S402), and when the operation is performed, the control unit 20 transmits a pilot signal (step S501).

Steps S502 to S508

Since operations in step S502 and subsequent steps are the same as those in Embodiment 1, the description thereof will be omitted.

Embodiment 3-2

Figure 11:
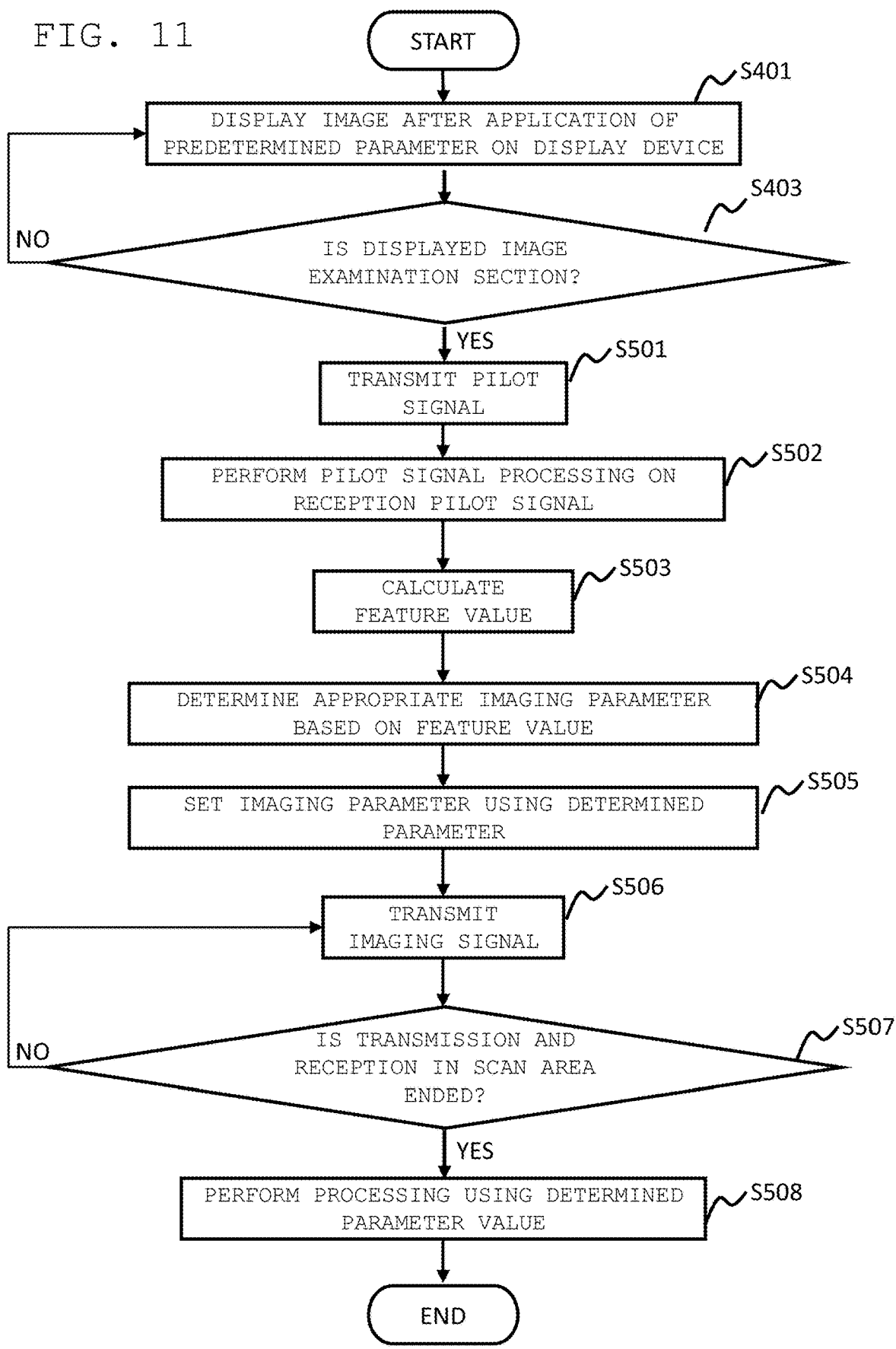
FIG. 11 is a flowchart showing an operation of each part of the ultrasound imaging apparatus 100 according to Embodiment 3-2.

Next, a configuration in which a pilot signal is transmitted in accordance with a probe operation performed by an examiner will be described with reference to a flowchart of FIG. 11.

In most ultrasound examinations, morphological and dynamic observations are performed in a state in which an examination section determined for each examination is displayed. Therefore, in Embodiment 3-2, it is determined whether an image displayed on the display device 50 during an operation of the ultrasound probe 108 by the examiner is an examination section, and when it is determined to be the examination section, a pilot signal is transmitted. In the ultrasound examination, the examination section is searched for and determined while a probe is operated on a body surface of a subject. Since a timing at which the high image quality is required by the optimization of a parameter is generally after the examination section is determined, a probe ultrasound signal is transmitted when the examination section is determined, and a parameter value is optimized, thereby enabling efficient parameter setting. Specifically, the processing is performed as shown in a flowchart of FIG. 11.

Step S401

The control unit 20 displays, on the display device 50, an image generated by the signal and image processing unit 40 using a predetermined parameter value.

Step S403

The control unit 20 determines whether the image displayed on the display device 50 during the operation of the ultrasound probe 108 by the examiner is an examination section (S403). A method of performing a circuit design in advance and determining an examination section in the signal processing device 101 executes, for example, an algorithm that specifies that an operation of the probe operation is delayed, or a recognition algorithm of a specific cross section using a technique such as machine learning, and determines whether the image displayed on the display device 50 is an examination section.

Step S501

When the control unit 20 determines that the image displayed on the display device 50 is the examination section, the control unit 20 transmits a pilot signal (step S501).

Steps S502 to S508

Since operations in step S502 and subsequent steps are the same as those in Embodiment 1, the description thereof will be omitted.

In the ultrasound examination, the examination section is searched for and determined while a probe is operated on a body surface of a subject. Therefore, the timing at which the high image quality is required by the optimization of a parameter is generally after the examination section is determined, and high frequency parameter optimization may not be necessary. In Embodiments 3-1 and 3-2, as described above, the parameter is optimized when the examiner requests or when a certain UI operation is performed and when the examination section is determined. Accordingly, efficient parameter setting is possible, and a calculation load of the ultrasound imaging apparatus can be reduced.

In the ultrasound imaging apparatus, while the examination section is being searched for, an imaging section dynamically changes, and a state of a reception signal is rapidly changed. Therefore, when a pilot signal is transmitted and a parameter value is tested while the examination section is being searched for, the determined parameter value also greatly changes, and image quality may not be stable. When the ultrasound probe 108 is operated at a high speed, since a position of the ultrasound probe 108 is different at the time of transmission of the pilot ultrasound signal and at the time of transmission of the imaging ultrasound signal, a parameter value that is not appropriate for a current imaging section may be set, and conversely, the image quality may be degraded. Under such an examination condition, it may be better to transmit the pilot ultrasound signal and optimize the parameter value according to the timing described in Embodiments 3-1 and 3-2 than to transmit the pilot ultrasound signal at a predetermined frequency.

What is claimed is:

1. An ultrasound imaging apparatus comprising:
   a transmission unit connected to one or more ultrasound elements and configured to switch between a pilot signal for causing the ultrasound element to generate a pilot ultrasound signal for detecting a feature of a subject and an imaging signal for causing the ultrasound element to generate an imaging ultrasound signal and transmit the pilot signal and the imaging signal;

a reception unit connected to the one or more ultrasound elements and configured to receive a reception signal that is output by the ultrasound element receiving an ultrasound wave from the subject;

a signal and image processing unit configured to perform signal processing on the reception signal based on the imaging ultrasound signal using a predetermined parameter to generate an image, and perform image processing on the generated image using a predetermined parameter;

a switch;

a feature value detection unit; and a parameter determination unit, wherein the switch is disposed between the reception unit and the feature value detection unit and the signal and image processing unit, and transmits the reception signal received by the reception unit to the feature value detection unit when the reception signal is a reception signal based on the pilot ultrasound signal, the feature value detection unit calculates a feature value, which is a value representing a mode of distribution in a depth direction of the subject of energy of the pilot ultrasound signal or an energy value at a specific depth of energy of the pilot ultrasound signal, based on the reception signal received from the switch, and the parameter determination unit determines, based on the feature value, one or more parameter values among parameters used for processing performed by the signal and image processing unit, and wherein the transmission unit divides an imaging area into a plurality of areas and generates the pilot signal such that one pilot ultrasound signal is transmitted for each of the divided areas, the feature value detection unit calculates, for each of the divided areas, the feature value from the reception signal based on the pilot ultrasound signal transmitted to the area, the parameter determination unit determines the parameter value for each of the divided areas from the feature value for each of the divided areas, and the signal and image processing unit processes a reception signal of the imaging ultrasound signal using the parameter determined for each of the divided areas, and generates an image for each of the divided areas.

2. The ultrasound imaging apparatus according to claim 1, wherein
a center frequency of the pilot signal matches with a frequency component of the reception signal used when the signal and image processing unit generates the image based on the reception signal of the imaging ultrasound signal.

3. The ultrasound imaging apparatus according to claim 1, wherein the pilot signal is a continuous ultrasound signal of two or more ultrasound waves.

4. The ultrasound imaging apparatus according to claim 1, wherein
a center frequency of the pilot signal is twice a center frequency of the imaging signal,
the signal and image processing unit performs harmonic imaging for extracting a second harmonic wave component included in the reception signal of the imaging ultrasound signal and generating the image, and
the parameter determination unit determines a parameter used for the harmonic imaging.

5. The ultrasound imaging apparatus according to claim 1, wherein the feature value detection unit includes an extraction unit configured to extract a reception signal in a predetermined frequency band from the reception signal of the pilot ultrasound signal received from the switch, and calculates the feature value from the extracted reception signal in the predetermined frequency band.

6. The ultrasound imaging apparatus according to claim 1, wherein
the feature value, which is a value representing a mode of distribution in a depth direction of the subject of energy of the pilot ultrasound signal, is any one of an energy gradient and an attenuation amount.

7. The ultrasound imaging apparatus according to claim 1, wherein
the parameter determination unit determines at least one of a center frequency, a bandwidth, and a cutoff frequency of a frequency band used when the signal and image processing unit processes the reception signal by a variable depth bandpass filter, and/or a gain used when the reception signal is subjected to a time gain control (TGC) process.

8. The ultrasound imaging apparatus according to claim 1, wherein
the parameter determination unit determines a frequency of the imaging signal based on the feature value.

9. The ultrasound imaging apparatus according to claim 1, wherein
the transmission unit generates the pilot signal such that one pilot ultrasound signal is transmitted in a predetermined direction of an imaging area,
the feature value detection unit calculates the feature value from the reception signal based on one pilot ultrasound signal,
the parameter determination unit determines at least one parameter value from the feature value based on one pilot ultrasound signal, and
the signal and image processing unit generates an image of the entire imaging area using the determined parameter value.

10. The ultrasound imaging apparatus according to claim 1, wherein the pilot ultrasound signal is transmitted once for each transmission of the imaging ultrasound signals required to generate one frame or several frames of images.

* * * * *